Figures 1, 2:
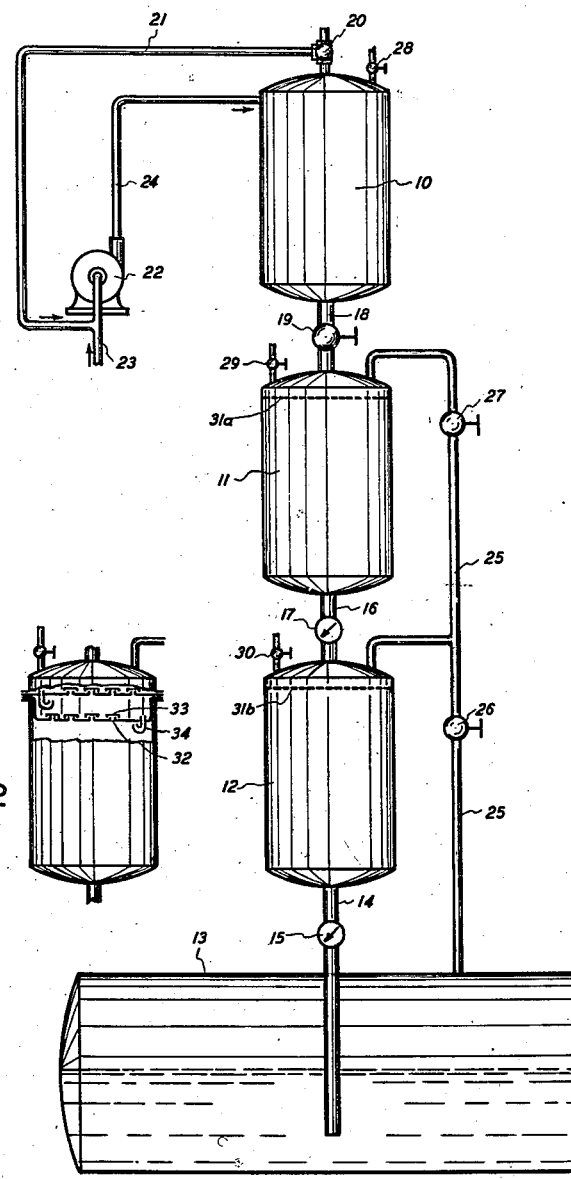

Sept. 1, 1936.  L. S. TWOMEY  2,052,855
DEVICE FOR INTRODUCING LIQUIDS INTO PRESSURE VESSELS Filed Oct. 26, 1934

LEE S. TWOMEY
INVENTOR

Paul W. Prutzman
ATTORNEY

Patented Sept. 1, 1936

2,052,855

UNITED STATES PATENT OFFICE 2,052,855

DEVICE FOR INTRODUCING LIQUIDS INTO PRESSURE VESSELS

Lee S. Twomey, Vista, Calif.

Application October 26, 1934, Serial No. 750,164

3 Claims. (Cl. 122—458)

The object of my invention is to provide means for introducing a liquid into a vessel containing vapors of the same liquid at relatively high superatmospheric pressure, as for example the supplying of feed water to a high pressure steam boiler.

The rational and advantages of the invention will be evident on inspection of the attached drawing and the following description thereof, in which: Figure 1 illustrates the assembled device in internal elevation, and Figure 2 illustrates a modified form of the plates 31a and 31b of Figure 1.

For illustrative purposes and without in anywise limiting the application of the device, I will describe its use in connection with feeding water at 80° C. into a steam boiler maintained at 50 atm. absolute pressure.

Referring to the drawing, 10, 11 and 12 are pressure vessels which may be of substantially the same size, or the upper vessel 10 may be of greater capacity and vessels 11 and 12 of the same size. These three vessels may be superimposed as shown or otherwise arranged, but they must be so placed that the contents of each will drain into the vessel below.

A steam boiler or other pressure vessel is indicated at 13. The lower portion or water space of this vessel is connected with vessel 12 by pipe 14 having a check valve 15 arranged to open downwardly. Vessel 12 is connected with vessel 11 by pipe 16 having a check valve 17 similarly arranged. Vessel 11 is connected with vessel 10 by pipe 18 having a stop valve 19. The upper vessel 10 is provided with a relief valve 20 discharging through pipe 21 into the suction of a pump 22 which also has a suction connection 23 to any source of supply of water. The discharge of this pump is connected into vessel 10 through pipe 24, which may enter at any height. The pump may be operated continuously to keep the upper vessel filled with water under a slight superatmospheric pressure and if a self-unloading type of pump, such as a centrifugal, be used the relief valve and return pipe may be dispensed with and only a vent 28 for air which may accumulate will be required. Tank 10 may be an open tank or other source of water under a relatively low superatmospheric pressure, as will be described.

The pressure vessel 13 has a steam pipe 25 communicating with vessels 11 and 12 at their upper ends, this pipe being provided with a stop valve 26 between the connections into vessels 12 and 13 and with a stop valve 27 between the connections into vessels 11 and 12. The upper ends of the three vessels are also provided with valve controlled vents to the atmosphere as indicated at 28, 29 and 30.

This apparatus is operated in the following manner. First assuming it to be cold (except as to the boiler 13) and the vessels to be filled with air: valve 19 is closed, vent 28 is opened and pump 22 is started, filling vessel 10 with water which may be at 80° C. Valve 19 and vent 29 are then opened, allowing water to flow into vessel 10 11 and displace air through the vent, and at the same time valve 26 is opened, allowing steam at boiler pressure to fill vessel 12 (displacing air through vent 30, which may be slightly opened for that purpose) and holding check 17 in closed position.

Valves 19 and 26 are now closed and valve 27 opened, allowing the steam pressure to equalize on the two sides of the water body in vessel 11. This water will now gravitate through check valve 17 into vessel 12, condensing the steam in this vessel and for the purpose of rapidly condensing the steam it is desirable to interpose a perforated plate or nozzle, indicated at 31b between the two vessels, so as to divide the descending water into streams having an extended contact surface with the steam. Check valve 15 is held closed by steam pressure from vessel 13.

Valve 27 is now closed and valve 26 opened, admitting steam pressure to the top of the water body in vessel 12, which thereupon closes check valve 17, opens check valve 15 and gravitates into vessel 13.

After closing valve 26 the above operations are repeated with the exception of venting the air, this step being required only at intervals as air may separate from the feed water. At this time the vessels may, for example be in the following condition—vessel 10 is filled with water at 80° C. and 2.1 atm. pressure; vessel 11 with steam at 2.1 atm.; vessel 12 with steam at 50 atm. and the boiler 13 with water and steam at 50 atm.

To introduce liquid from vessel 10 into boiler 13 we first open valve 19, all other valves being closed and it being assumed that vessel 10 is kept continuously filled. The water passes downwardly through perforated plate 31a, condensing the steam in vessel 11 and filling that vessel. We then close valve 19 and open valve 27 which permits the equalization of pressure between vessels 11 and 12 and the downward passage of the water from vessel 11 to vessel 12, the steam in the latter vessel condensing. Finally we close valve 27 and open valve 26, allowing the pressures to equalize in vessels 12 and 13 and the water in vessel 12 to flow into vessel 13 by gravity. This sequence of operations may be repeated immediately or at such intervals as to supply the desired amount of water to vessel 13. By providing the entire apparatus in duplicate and inserting an orifice or other flow control means in pipe 14 (in addition to the check valve) a continuous flow of water into the lowest vessel may be produced, whereas the single apparatus illustrated is limited to an intermittent flow.

The purpose of perforated plates 31a and b is to ensure the rapid condensation of the steam in vessels 11 and 12 by the water descending from the vessel next above, as if this steam is permitted to sidetrack the descending water and pass directly to the upper side of the water body it will condense so slowly as to materially reduce the capacity of the apparatus.

For this reason the branch steam pipes controlled by valves 26 and 27 should preferably connect with the corresponding vessel at a level above the perforated plate, and the perforations should be sufficiently small and numerous to offset any tendency for the steam to pass upwardly through one side of the plate without condensing.

This tendency may be entirely avoided by substituting for the perforated plates the bubble cap type of plate used in fractionating columns and conventionally illustrated in Figure 2. Where these plates are used the steam is forced to pass upwardly through nozzles 32 and beneath the caps 33 through a layer of water which is retained on the plates by the sealed downspouts 34.

In place of individually operated valves as indicated at 19, 26 and 27 it is both feasible and desirable to use valves automatically operated as by means of solenoids controlled by timed electrical interrupter, or by means of cams and linkage actuated by any source of power. These devices may readily be so arranged as to reverse the positions of the various valves in the proper sequence and at such intervals as to permit the apparatus to function at the desired rate of feed. Another obvious modification, which is particularly appliable to electrically controlled valves, is to make them responsive through floats and electrical contacts to changes in liquid level, so that the filling or emptying of one vessel initiates the valve settings necessary for the next step. I do not claim these devices, which could be modified over a wide range and which are not part of my invention, but wish it to be understood that by the use of the term "manual" as applied to these valves I do not intend to limit myself to valves actually moved by the hand of an operator.

The number of vessels arranged in series and the pressures described herein are illustrative only. The pressure in the initial vessel 10 with any given pressure in the final receiving vessel is reduced by lowering the temperature of the liquid supplied and/or by increasing the number of condensing vessels such as 11 and 12. This initial vessel may be replaced by a connection to any water system having sufficient pressure to overcome the residual vapor pressure in the condensing vessel next below, or by an open tank placed at a sufficient height to overcome this pressure by hydrostatic head. The minimum number of vessels in the train is, obviously, one supply vessel 10 or its equivalent as just described, one condensing vessel and the receiving vessel, but any greater number of condensing vessels may be used.

The check valves shown at 15 and 17 are entirely automatic and are desirable, but it is within the spirit of my invention to replace them with valves of any other type, either automatic or manual.

By the use of the apparatus above described a liquid may be introduced into a vessel containing vapors at high pressure without the use of a pump or any other mechanism and without the loss of any vapor or liquid. Materials which are difficult to pump at high temperature, such as hot oils or distillates, may thus be fed into stills or cracking furnaces under the pressure due to vaporization of the oil, avoiding all the mechanical and packing troubles incident to pumping at high temperatures and pressures.

When used for feeding boilers the principal advantage of the apparatus over feed pumps is economy of power, the water being brought to boiler pressure by the consumption of the quantity of heat necessary to bring it to boiler temperature and frictional losses and losses due to the low thermal efficiency of the boiler feed pumps customarily used being substantially entirely avoided.

I claim as my invention:

1. A device for feeding a liquid initially at relatively low temperature and pressure into a substantially closed vapor-vessel containing vapor at relatively high temperature and pressure, comprising: a plurality of superposed substantially closed feeding-vessels placed in train and substantially above said vapor-vessel; liquid-conduits affording communication from the uppermost of said feeding-vessels through the length of said train into said vapor-vessel; a valve in each said liquid-conduit; a vapor-conduit affording communication between the vapor space of said vapor-vessel and the upper part of the lowermost vessel of said train; a vapor-conduit affording communication between the upper part of each said feeding-vessel except the uppermost with the upper part of the feeding-vessel next above, said vapor-conduits being independent of and separated from said liquid-conduits; a valve in each said vapor-conduit; means for introducing said liquid into the uppermost of said feeding-vessels; a valve in said introducing means.

2. A device for introducing low pressure liquid into a receiver containing vapor at a relatively high pressure including a substantially closed vessel adapted to be filled with said liquid; a vapor channel between said receiver and said vessel; means for producing a flow of liquid from said vessel into said receiver, and means arranged in the path of flow of said liquid for producing heat exchange between said liquid and said vapor, whereby portions of said vapor are condensed.

3. The method of introducing liquid into a closed receiver containing vapor at relatively high pressure which comprises: establishing a supply of said liquid in a closed vessel under a relatively low pressure; establishing vapor communication between said vessel and said receiver and thereby equalizing the pressures therein; gravitating said liquid from said vessel into said receiver and simultaneously substantially lowering the equalized pressure by condensing a material proportion of said vapor within the closed system comprising said vessel and said receiver.

LEE S. TWOMEY.